United States Patent [19]

Dansac et al.

[11] 3,764,980

[45] Oct. 9, 1973

[54] SYMBOL RECOGNITION SYSTEM PARTICULARLY FOR ALPHA-NUMERIC CHARACTERS

[75] Inventors: Jean Dansac; Robert Picciotto; Jean-Pierre Bouron, all of Louveciennes, France

[73] Assignee: Thomson-CSF, Paris, France

[22] Filed: Sept. 22, 1971

[21] Appl. No.: 182,690

[30] Foreign Application Priority Data

Sept. 25, 1970 France .............................. 7034797

[52] U.S. Cl. ................. 340/146.3 ED, 340/146.3 D

[51] Int. Cl. ............................................. G06k 9/02

[58] Field of Search .................................. 340/146.3

[56] References Cited

UNITED STATES PATENTS

| | | | |
|---|---|---|---|
| 3,585,588 | 6/1971 | Hardin et al. | 340/146.3 D |
| 3,644,889 | 2/1972 | Skenderoff et al. | 340/146.3 G |
| 3,200,373 | 8/1965 | Rabinow | 340/146.3 MA |

*Primary Examiner*—Maynard R. Wilbur
*Assistant Examiner*—Leo H. Boudreau
*Attorney*—Cushman, Darby and Cushman

[57] ABSTRACT

A combination of two symbol recognition systems, one of which is of the logic type and the other of the analogue type. The latter is put in operation by the logic system in case of ambiguity in the identification of symbols by the logic system. The combination allows the use of simplified recognition systems.

5 Claims, 11 Drawing Figures

SYMBOL RECOGNITION SYSTEM PARTICULARLY FOR ALPHA-NUMERIC CHARACTERS

The present invention relates to a symbol recognition system and more especially a symbol recognition system which is used for the recognition of alpha-numeric characters such as typewriting characters or characters responding to a predetermined standard shape. The performances of such systems and of the associated handling units are improved by the use of alphabets standardized for the purpose of optical recognition which are generally designated under the appelation "ORC" ("Optical Recognition of Characters").

The character recognition systems which use analogue data processing operate a correlation between a character to be identified and a set of optical references called "correlation masks" or "optical matched masks." Other character recognition systems use a logical data processing where the characteristics of the characters to be identified are translated into binary words which are compared with binary reference words.

The embodiments of the analogue type are fairly simple but the performances are very rapidly limited by deformation of characters and defects in centring. Also the reliability decreases severely when the number of references becomes high.

The embodiments of the digital type have a high efficiency regarding the identification of characters having substancially dissimilar shapes; an acute discrimination of characters having similar shapes requires complex technical solutions.

According to the present invention there is provided a symbol recognition system comprising in combination a logic recognition system and an analogue recognition system. Predetermined symbols among the total number of the different symbols to be identified are recognized directly by the logic system. There is ambiguity for remaining symbols considered; the analogue system is then put in operation by the logic system and provided for the identification of those symbols which have not been unambiguously identified by the logic system.

The present invention will be described further by way of example, with reference to various embodiments of the invention, as illustrated in the accompanying drawings, in which.

Figure 1:
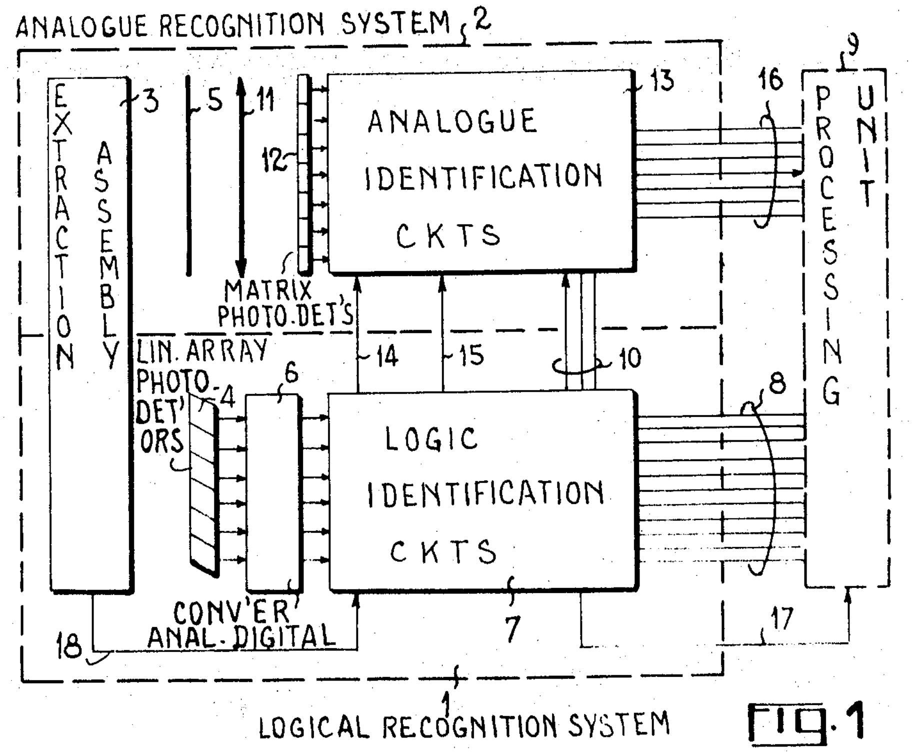
FIG. 1 is a general block diagram showing an embodiment of the invention.

Referring to FIG. 1 there is shown a diagrammatic general arrangement of one embodiment of a symbol recognition system. The system includes a first recognition assembly 1 of the logic type and a second recognition assembly 2 of the analogue type. Extraction means 3 such as an opto-mechanical device enables the symbols that are to be analyzed, such as characters on a document, to be optically projected successively, at the input of each of the recognition assembly 1 and 2. An optical projection is effected firstly at the input of the logical device 1 ane then at the input of the analogue device 2 after a predetermined constant time delay. The extraction means 3 provides an optical projected image on a linear array of photo-detectors 4 constituting the input of the assembly 1, each chracter displayed moving uniformely and transversally to the direction of the said array. If one considers the array 4 to be vertical, the shift of the projected symbol is horizontal. The optical displaying means 3 provides, in the other hand a plurality K of identical images of a said character on a plane 5 supporting a set of K optical reference masks each corresponding to a specific character. The projection of a character to be analysed is effected at the input of the assembly 2 after its passage in front of the array 4 of the assembly 1 and during the appearance of the following symbol that is to be identified in front of the said array 4. In the case, for example, of the recognition of characters by continuous scanning of a document line by line, this condition can be produced by taking into account the spacing step between successive symbols which is generally substantially constant. The optical displaying means 3 is not described herein, its realization is made in accordance with known techniques using, for example, optical devices such as oscillating mirrors and optical lens of the "fly's eye" type.

The analogue signals delivered by the array of photodetectors 4 are converted into digital form by an analogue-digital converter circuit 6 then applied to logic circuits 7. The logic system, described hereinafter, is of simple construction and is particularly well suited to the optical reading of characters and numerals standardized from the point of view of shape, thickness of the lines, contrast, height and spacing between characters. Its application can also possibly be extended to the recognition of handwritten signs of simple shapes and calligraphed in accordance with pre-established rules.

In accordance with the invention, the various symbols whose analysis is envisaged are classified into various families by means of a topological analysis of their shape. Each symbol is considered sectioned by orthogonal secants, some vertical, the others horizontal. The intersections of the secants with the lines of the symbol enable a binary identification code to be established by considering the presence or the absence of an intersection at precise locations of the plane of the symbol along these secants. At each of these locations, the presence of a section with a line is for example translated by the value 1 whilst its absence is given by the value 0. In a preferred manner, but not limiting for the invention, the intersection localisation number per secant is limited to three. Vertically, the localisations are considered at the top, in the centre and at the bottom of the symbol and horizontally to the left, in the centre and to the right.

Figure 2:
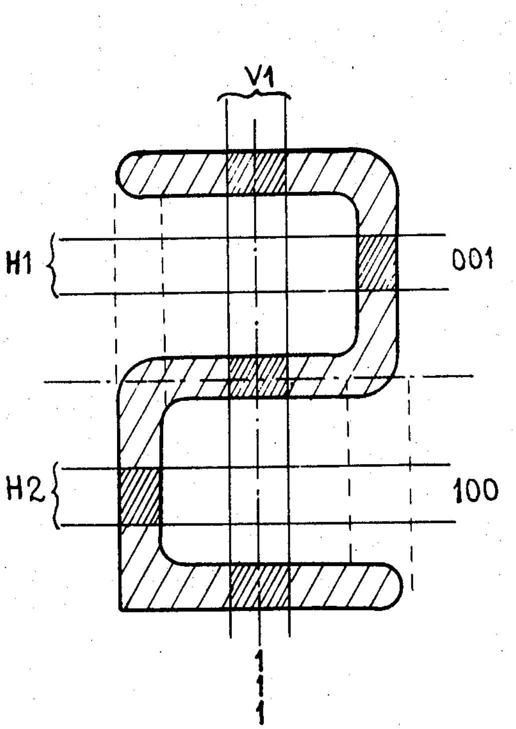
FIG. 2 is a representation illustrating the coding principle of binary identification by means of horizontal and vertical sections.

FIG. 2 shows by way of example, the intersections of a numeral 2 of the "ORC A" alphabet type, by means of a vertical section V1 along the vertical axis of symmetry and two horizontal sections H1 and H2 situated on either side of the horizontal axis of symmetry. The vertical section V1 establishes the code 1-1-1 while horizontal sections establish the code 001 for H1 and 100 for H2. The symbol is then defined by means of a binary code having 9 bits. It is understood that the number of secants can be different from the simple case envisaged; for example, the use of two vertical secants and five horizontal secants allows the symbol to be translated by an identification code containing 21 bits of information by considering three distinct localisations per secant. The different symbols of a given unit can thus be represented by a truth table expressing the various identification codes. The recognition is effected according to this principle in the logic assembly 7, at least, for the symbols to be recognized which have respectively particular topological characteristics distinct from those of the other symbols envisaged and consequently distinct binary identification codes allowing this identification without ambiguity. All the other symbols to be recognized are distributed into a certain number of families each containing at least two symbols. For example, the letters O, D and Q have topological similarities and consequently may present a common binary code and therefore constitute one family. It will be noticed that an increase in the number of secants and of localisations of sections allows one to increase the amount of discrimination of the symbols and hence reduce the number of families, but at the price of a higher complexity of the logic assembly which is contrary to the aim contemplated. The logic recognition assembly 1 is envisaged to obtain an identification code, preferably, between 9 and 21 bits so as to ensure the realisation thereof by means of a simple structure of logic circuits 7. The recognition of the symbols of a family is effected by means of the second recognition assembly 2 of the analogue type, constituting a second decision stage.

The analogue assembly 2 comprises a reduced number of optical matched masks corresponding to the remaining plurality of symbols distributed in the various families, to the exclusion of those recognized directly with the aid of assembly 1.

The outputs 8, in FIG. 1, relate to the symbols identified directly by the logic recognition assembly 1, the signals arriving therein are applied directly to an associated processing unit 9. The outputs 10 relate to the various families envisaged and are connected to the analogue assembly 2. This second recognition device proceeds by optical correlation in real time with non-coherent lighting according to known techniques. The correlator, of the multi-channel type, comprises, downstream of the plane 5 of the matched masks, optical focusing lens 11 also called integrating lens and a two-dimensional array of photo-detectors 12 or matrix situated substantially at the correlation plane. The outputs of the photo-detectors are applied to an assembly 13 of analogue circuits receiving, from the logic recognition assembly 1, the family signal of the symbol in question on one of the connections designated at 10, as well as other signals at 14 and 15 relating to the vertical and horizontal centering of the image projected at the input of the optical correlator. The centering data are processed by the logic assembly 1 by spatial measuring of a possible vertical decentering and by time measuring of the horizontal centering of the image of the symbol moving past. The vertical centering signal 14 is exploited to ensure the vertical spatial selection of the photo-detectors on which there appears the correlation peak, it being understood that associated with each mask there is a battery of photo-detectors comprising at least one vertical linear array. The horizontal centering signal 15 commands the time selection of the said peaks during a specific interval of time corresponding to the horizontal centering of the images of the symbol in question before the correlation masks. The family signal allows one to select, in complement, a limited number of analogue processing channels corresponding to the symbols included in the family in question. The correlation peak of maximum amplitude appearing at th output of the channels selected expresses the identification of the symbol projected. A corresponding identification signal appears on one of the outputs 16 each relating to one symbol. These outputs are connected to the processing unit 9.

A reject information is generated when the binary identification code of the symbol projected on the array 4 does not correspond to any of the symbol or envisaged family codes, as well as, when the vertical framing of the said symbol is beyond predetermined maximum tolerances of vertical decentring. This reject information, processed by the logic assembly 1, is transmitted at 17 to the processing unit 9 for non-takeover of the corresponding symbol.

A synchronisation signal is transmitted through the connection 18 extending from the optical displaying means 3 to the assembly of the logic circuits 7. This signal expresses, preferably in the form of a pulse train, the uniform movement of the optical projection and can be processed in accordance with known techniques. According to one known embodiment, the synchronisation signal is processed by a coded disc in synchronous or proportional rotation with the mechanical movement of optical scanning. The signal 18 is used more especially to create the gates for horizontal reading defining the localisations of sections of the symbol along horizontal secants as well as the vertical reading gates defining the localisations of the vertical secants, the time reference being given by the start of passage of the projected symbol.

Figure 3:
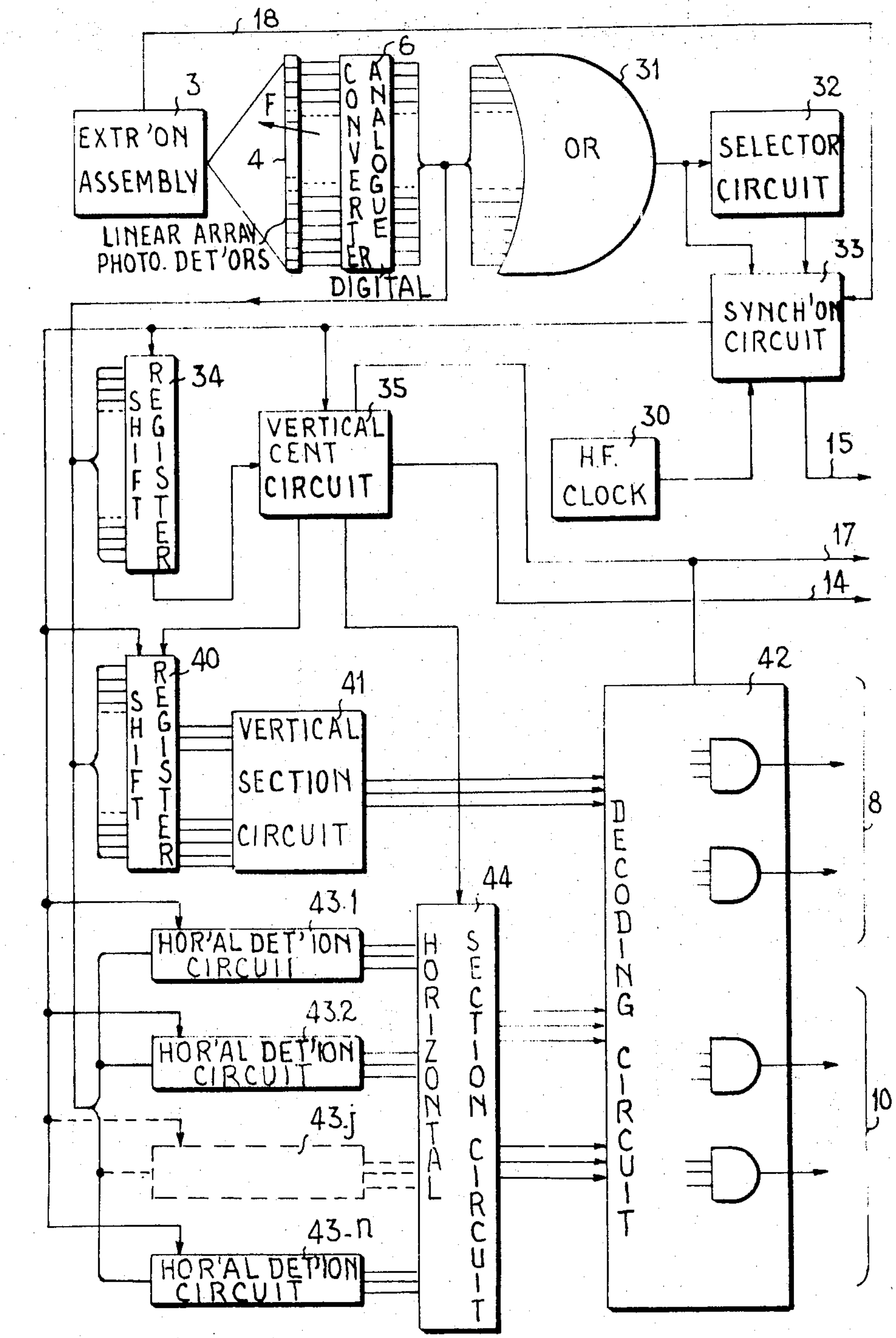
FIG. 3 is a diagram showing an embodiment of the logic identification assembly.
Figure 4:
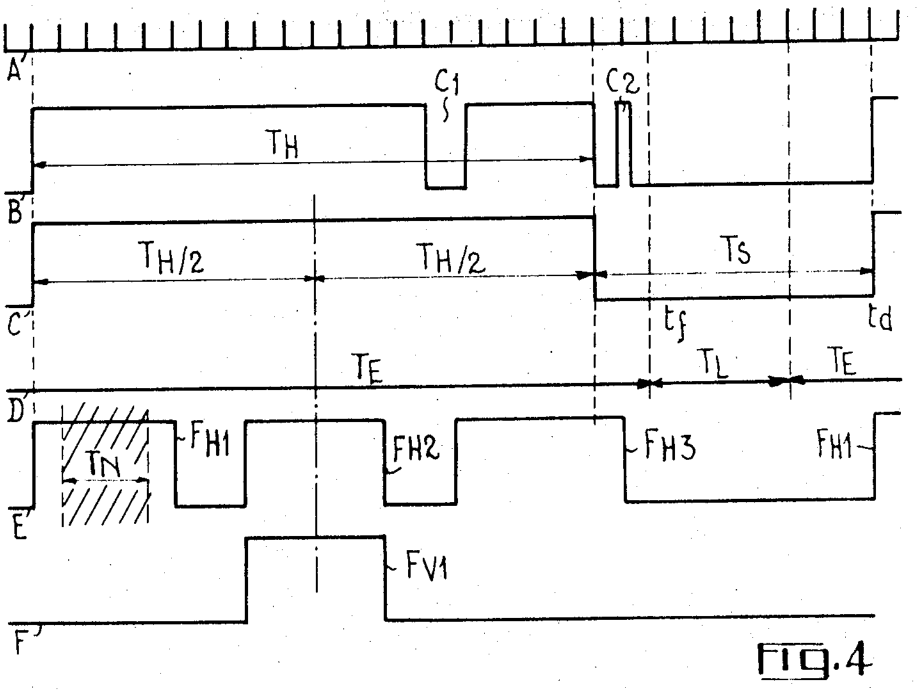
FIG. 4 is a representation of wave forms relating to the operation of the logic recognition assembly.

FIG. 3 shows a simplified diagram of one embodiment of the logic recognition assembly 1. The optical device 3 optically projects the image of the symbol to be identified on plane of the linear photo-detecting array 4, the said image moving uniformly along a direction F orthogonal to the array. The number of elements of the array 4 is greater, with a specific margin, than that corresponding to the generally standard height of the symbols to be recognized so as to detect in a specialised circuit the vertical positioning of the projected symbol and to evaluate the possible vertical decentering. The outputs of the photo-detectors after translation of the levels in digital form in the circuit 6, are applied to the logic assembly 7 of FIG. 1, a signal 1 corresponds for example to a black and a signal 0 to a white. The logic system is controlled by two synchronisation clocks or timing pulses. A first low frequency train of signal pulses is given, as has been said previously by the signal applied at 18 which can be processed by reading a coded disc whose speed of rotation is proportional to the speed of drift of the symbol. The duration of passage of a character over the array 4 is measured by a certain number of periods of pulses of this clock signal, for example, of the order of 20. The low-frequency clock allows pulses registration of the items of information tied to the presence of the symbols during the passage of their image over the reading array 4. Second clock pulses of relatively high frequency with respect to the preceding one is produced by a circuit 30, such as an oscillator. The high-frequency clock pulses conduct the reading process enabling identification of a symbol or its family after projection. A synchronisation device enables the passage from the one to the other of these clocks, the identification being effected between the end of passage of one symbol and the start of passage of a subsequent symbol. The synchronisation device comprises a first OR-circuit 31 receiving the binary photo-detection outputs and producing a gate shown in FIG. 4B of width $T_H$ equal to the duration of the passage of the symbol. A selector circuit 32 enables discontinuities to be eliminated due to defects such as a typing defect within a symbol producing a white and consequently an instantaneous interruption $C_1$ of the gate, or conversely a spot external to the symbol expressed by a complementary pulse $C_2$ to the said gate. These defects are eliminated to the extent that their time width remains less than that of a line of the outline of the symbols. By way of example, if the width $T_N$ of a mean line corresponds to three periods of low frequency pulses (FIG. 4A), the selector device can be conceived to eliminate such defects up to the value of two periods (FIG. 4C). The gates of horizontal duration $T_H$ issuing from the OR-circuit 31 and from the selector 32 are applied to a synchronisation circuit or time base circuit 33 receiving moreover the low and high clock signals and processing various signals used by the logic assembly: pulses for decoding, zero setting, trains of pulses towards shift registers where items of information are stored during the passage of the image, horizontal and vertical reading gates, etc. In particular, the logical system is synchronised to the rhythm of the high frequency clock pulses during a period $T_L$ constituting a fraction of the minimum duration $T_S$ separating the projection of two successive symbols. The selector circuit 32 ensures, in addition to the elimination of parasitic pulses, the validation of the end of the horizontal gate by detecting the presence of white during for example two clock periods. When this test is positive the synchronisation circuit 33 triggers off the identification process at the rhythm of the high frequency clock pulse. The reading duration $T_L$ is established between the instant $t_f$ of end of the horizontal gate validated by the selector 32 and before the instant of start of projection of the following symbol. The rest of the time $T_E$ during which the recording is effected is synchronised by the low frequency clock pulses. The result is that a recognition device in accordance with the invention is suitable for the identification of symbols separated by an interval in the course of which the reading is effected. The circuit 33 comprises a counter effecting the counting down of the low frequency clock pulses from the instant $t_d$ of start of the projection of a symbol. The decoding of the state of the outputs of this counter enables gates or windows of specific width used for the vertical and horizontal sections to be processed. By way of example, one can produce three time gates (FH1, FH2, FH3, FIG. 4E) for localisation of the intersections by horizontal secants, aand one (FV1, FIG. 4F) or more windows intended for the sampling by vertical secants. The duration of the windows is determined more especially greater than that $T_N$ of passage of a line of the outline of the symbol (FIG. 4E). The third horizontal window FH3 (FIG. 4E) corresponding to the end of passage of the symbol can be determined of duration longer than the others in order to take into account possible variations in width of the symbols to be identified. On the other hand, the time base circuit also processes the horizontal centering signal transmitted at 15 towards the analogue assembly. This signal takes into account the central position of the horizontal gate (FIG. 4C) constituting the time reference of the vertical axis of symmetry of the projected symbol, and the predetermined delay corresponding to the delay between the projections of the symbol in question in front of the two recognition devices 1 and 2 (FIG. 1). The signal 15 has the form of a gate pulse of width corresponding substantially to the duration of passage of an average line and is centred on the said time reference shifted so as to sample the items of information of optical correlation in the optimum conditions of horizontal centering of the symbol in front of the masks 5 (FIG. 1).

Vertical centering circuits detect the vertical position of the symbol on the array and process an information about the vertical positioning used concurrently with the sets of information relating to the horizontal and vertical sections, so as to take into account possible variations in vertical centering. These circuits comprise a shift register 34 having parallel inputs and series output. This register is fed by the binary photo-detection outputs. When the symbol passes in front of the array 4 the pulses 1 correspording to a black are stored progressively in the register 34 in the stages corresponding to the vertical spatial position of the symbol. After passage of the said symbol, control signals processed by the time base circuit 33 allow the register to be emptied, these signals are constituted by a train of pulses at the rhythm of the HF clock pulses. The output signal from the register 34 is applied to logic circuits 35 constructed in accordance with known techniques and also receiving the said train of pulses in order to effect the decoding of the decentering. An embodiment of logic circuits 35 is described for instance in applicant's earlier application Ser. No. 132,504. A period separating two pulses corresponds in this way to a decentering of the value of a photo-detector on the array 4. The circuits 35 comprise a counter evaluating the number of "white" or 0 pulses before presence of a "black" or 1 pulses, this number characterises the positioning of the bottom of the projected symbol. A corresponding vertical centering reference signal is processed and used in the circuits of vertical and horizontal sections. The vertical centering information is also transmitted at 14 to the analogue assembly 2 (FIG. 1).

The symbols which are beyond the decentering tolerances are rejected. The rejection decision is taken when the combination representing the decentering of a symbol is either the first (bottom rejection) or the last (top rejection). The rejection information is supplied by corresponding logic circuits included in the circuits 35.

Vertical section circuits comprise, for each vertical section at the input, a shift register 40 having parallel inputs ane outputs, fed by the binary photo-detection outputs. In the example of FIG. 3 a single vertical section is envisaged. The time base circuit 33 delivers a vertical reading window FV1 (FIG. 4F) corresponding to the localisation of this section centred on the axis of symmetry of the symbol. During the application of this window the "white" or "black" items of information of the symbol are stored and remain there until the moment when the pulse selector 32 decides on the end of passage and the start of reading. At this moment, a pulse train representing the centering information of the character and emanating from the circuits 35 is applied to the register 40 and shifts accordingly the states of the stages of the register so as to form in all the cases of decentering a decentering a recentering according to which the bottom of the register 40 corresponds to the bottom of the projected symbol. Logic circuits 41, fed by certain outputs of the register 40 detect the possible presence of a line at the top and bottom of the symbol. These circuits can be produced from logic gates decoding the presence of a "black." The validation of the test can be obtained by dispatch of a reading pulse to the decoding gates, which brings about a change of state of memory trigger circuits positioned in the outputs of the gates. The register 40 is then emptied completely by application of a signal amanating from the base circuit 33. During this operation another logic circuit detects the presence or the absence of line in the middle of the symbol. This circuit, in order to take account of the possible variations in vertical positioning of a median line, contrarily to the fixed positioning of the lines situated at the top and at the bottom for symbols considered of uniform height, is produced in a manner different from the other logic circuits assembled in the block 41. One embodiment is described hereinafter with the aid of FIGS. 5 to 7. A code having 3 bits corresponding to a vertical section is obtained at the output of the assembly 41 and applied to a decoding matrix 42.

This matrix 42 receives, moreover, the codes relating to the horizontal section namely, in accordance with this example, two codes of 3 bits each for two horizontal sections having three localisations. The circuits of horizontal sections of the symbol comprise a set of identical logic circuits 43-1 to 43*n* covering for these sections all the possibilities of decentering of the symbol in the areas envisaged. Their number can be determined less than that of the photo-detectors of the array 4 by taking into account that the total vertical area, delimited by the remotest horizontal sections upwardly and downwardly of the axis of horizontal symmetry of the symbol and in the predictable conditions of vertical decentring, generally eliminates a certain number of photo-detectors situated at each end of the array 4 which are used for the identification of vertical sections. If one takes into account also that the width of an average line vertically covers a plurality of several photo-detectors, it is possible to reduce the number of the logic circuits 43j by associating them, for example, with one photo-detector over two successively and respectively. After passage of the symbol that is to be identified, a change-over circuit 44 controlled by vertical centering pulses emanating from the circuit 35 allows only the sections corresponding to the provided horizontal localisation to be selected. Each circuit 43j detects the presence of a possible line to the left, in the centre and to the right. The instants of detection are controlled by the horizontal windows FH1, FH2 and FH3 (FIG. 4E) processed by the circuit 33. One embodiment of the circuits 43 and 44 will be described hereinafter with the aid of FIGS. 8 to 10.

The decoding of the items of information given by the vertical and horizontal sections is effected in a logic matrix 42 representative of the truth table. This matrix is constructed by a non-detailed assembly of AND-gate logic circuits. A symbol or its family is identified by the detection of the coincidence between the binary digit displayed at the input of the matrix and one of the stored logic combinations. One symbol may possibly be defined by several codes if it is desired to take into account possible deformations of the outline. Any code not having any correspondence with one of the stored codes triggers a rejection order 17 towards the processing unit. The family outputs 10 are applied to the analogue assembly 2 (FIG. 1) and the symbol outputs 8 to the connected processing unit 9 (FIG. 1).

Figure 5:
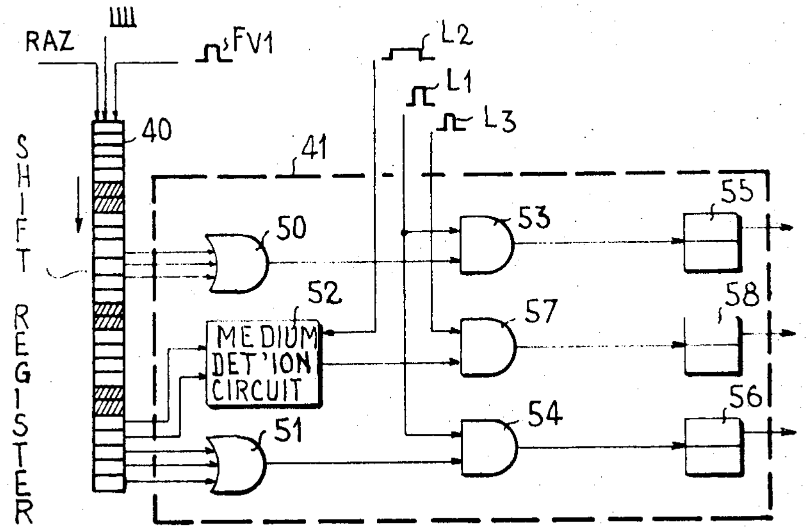
FIGS. 5 to 7 are diagrams and wave forms relating to logic vertical section circuits.
Figure 6:
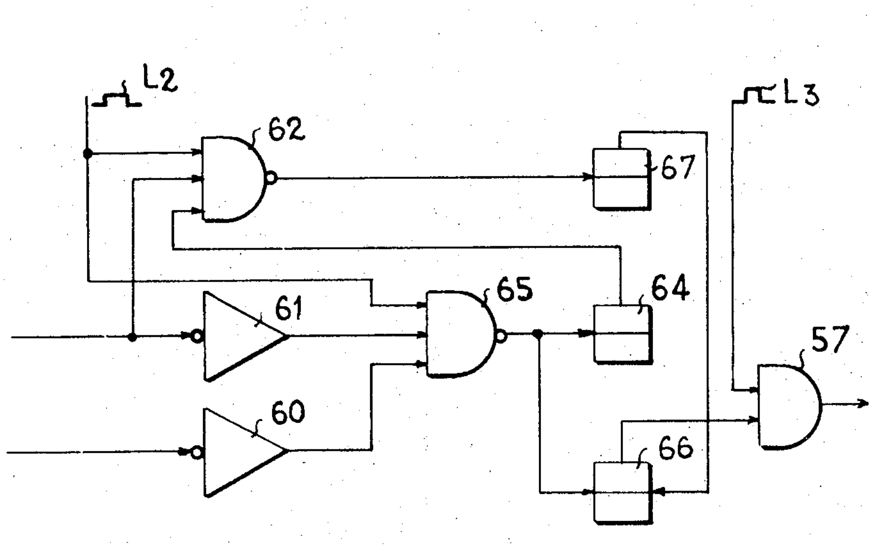
Figure 7:
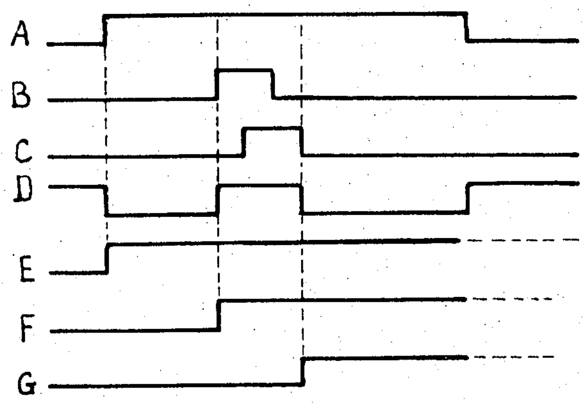

One embodiment of the circuits of vertical sections is shown in FIGS. 5 and 6. FIG. 5 shows a general diagram of the circuits of a vertical section. The binary photo-detection signals are stored in the register 40 upon the application of the vertical window FV1. During the reading phase, the decentering pulses shift these items of information by bringing the bottom of the symbol back to the lower stage of the register. Two OR-circuits 50 and 51 detect the presence of possible sections at the top and at the bottom of the symbol, these sections being considered at localisations fixed for a standard height of the symbols. The number of inputs is provided to cover the average width of a line. In accordance with this example it is considered that a line allows two to three photo-diodes to be sensitised and the number of inputs of the OR-circuits is taken equal to three. The detection of a median intersection is realised by a circuit 52 shown in FIG. 6 and is effected after storing of the top and bottom information by means of AND-gate circuits and trigger circuits 55, 56. A reading gate L1 applied to the gate circuits 53 and 54 triggers the storing. Then, the register is emptied of its contents by the application of a pulse train which effects the zero ressetting "RAZ." A time gate L2 applied to the circuit 52 triggers the sampling of the information of median section, its duration corresponds to the passage of the character centre and prohibits the detection of the top symbol information by the circuit 52 upon emptying of the register. The median section detection uses two stages of the register 40 upstream of the bottom section detection stages. A first stage is connected to the input of a reversing gate circuit 60 and the second to a second reversing gate circuit 61 and to an input of an AND-gate reversing circuit 62. This latter receives by two other inputs, respectively the gate pulse L2 and the output of a trigger circuit 64. A second reversing AND-gate circuit 65 having three inputs receives the gate pulse L2 and the outputs of the reversers 60–61. The output from the gate circuit 65 is applied to the respective input of the trigger circuits 64 and 66 and that of the gate circuit 62 to a third trigger circuit 67. The trigger circuits 64 – 66 – 67 are triggered on a negative front, passage from 1 to 0 of the control signal. The zero resetting connections of the trigger circuits are not shown. The assembly allows the detection of a median vertical intersection if a white-black-white sequence such as two whites one black two whites is produced. The gate output 65 (FIG. 7D) passes from 1 to 0 upon application of the gate pulse L2 (FIG. 7A) and that the condition two whites is realised, signal 0 on the inputs of the circuits 60–61 (FIG. 7B). The trigger circuit 64 then passes from 0 to 1 (FIG. 7E) and opens the gate circuit 65 upon appearance of a black (FIG. 7B). The result is the triggering of the circuit 67 (FIG. 7F) whose output is applied to the trigger circuit 66. This latter is triggered (FIG. 7G) when a negative front reaches it through its other input, that is to say after passage of one or more successive blacks and as soon as two whites are present at the inputs to the inputs to the circuits 60–61.

This condition being realised, the possible section information is transmitted to the AND-gate circuit 57 which upon application of a reading signal L3 transmits it to the store circuit 58, information 0 in the case of absence of black and information 1 in the opposite case.

Figure 8:
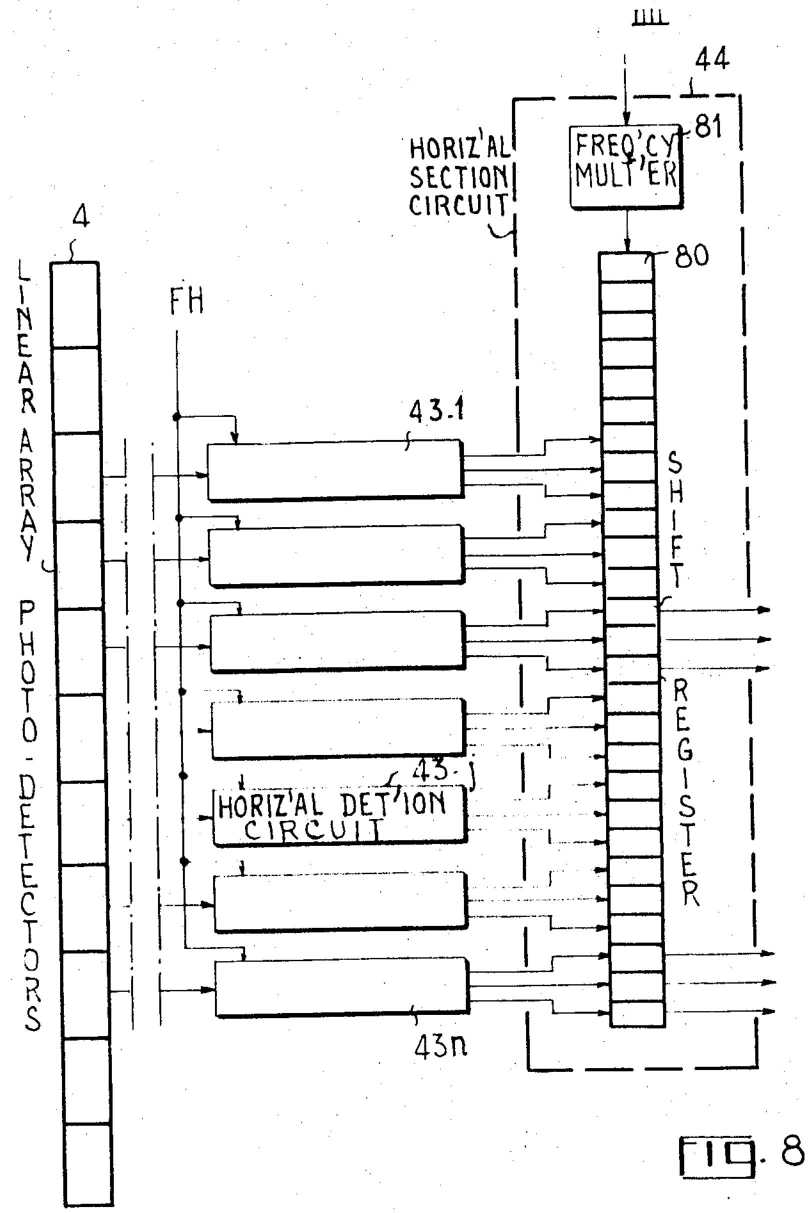
FIGS. 8 to 10 are diagrams and wave forms relating to logic horizontal section circuits.
Figure 9:
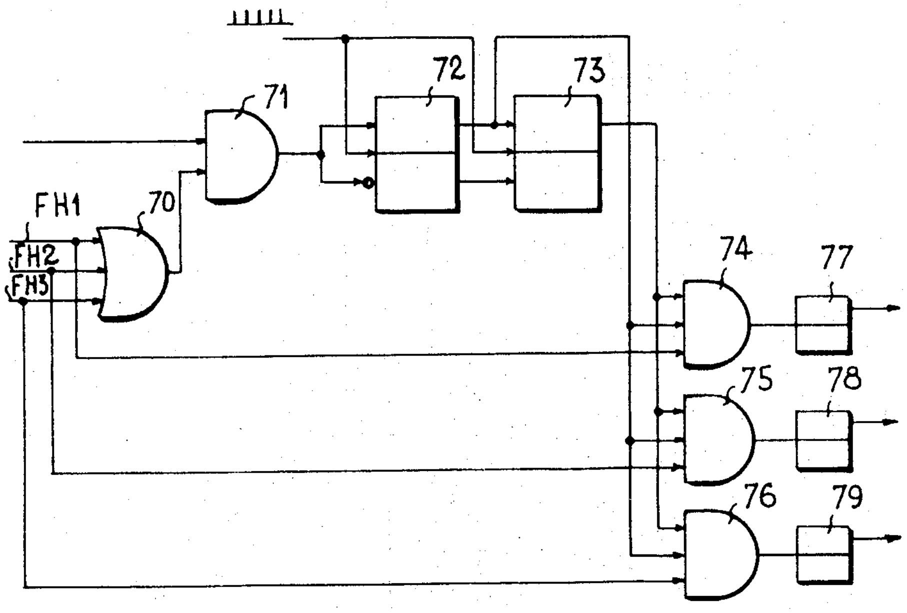
Figure 10:
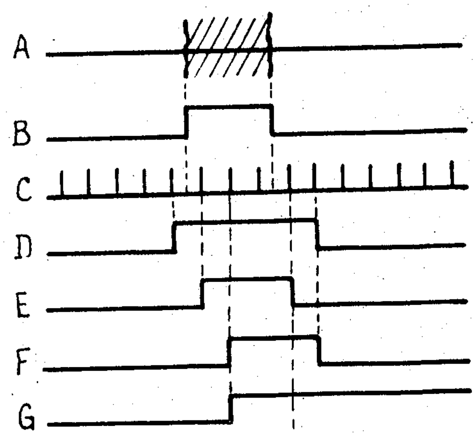

One embodiment of the horizontal section circuits is represented in FIGS. 8 and 9. FIG. 8 shows a general diagram and FIG. 9 an embodiment of one of the logic circuit 43*j*. As has been seen previously, the number of logic circuits is determined as a function of the vertical area covered by the horizontal sections taking account of the extremes possibilities of the vertical decentering of the projection upwardly and downwardly. Each logic circuit comprises an OR-gate circuit 70 having three inputs receiving the signals FH1, FH2 and FH3 respectively or horizontal windows shifted in time. Its output is connected to an AND-gate circuit 71 receiving by a second input the corresponding photo-detection binary signal. In the presence of a line (FIG. 10A) this latter signal passes from the value 0 to 1 (FIG. 10B). If, simultaneously a window signal is applied (FIG. 10D), the output of the circuit 71 passes from 0 to 1 and is transmitted (FIG. 10D) to the first stage 72 of a shift register having two stages 72 and 73. The register is controlled by a pulse train at the period of the BF clock (FIG. 10C). The outputs of the two stages are equal to 1 (FIG. 10E and 10F) when the black pulse (FIG. 10B) is greater than one low frequency period and allows under these conditions the control of an AND-gate 74, 75 or 76 receiving the same horizontal window signal, for example the gate 74 when the signal FH1 (FIG. 10D) is applied. The introduction of a third register stage and of AND-gate circuits having four inputs instead of three would allow the section to be selected if the black signal is greater than two LF periods, and so forth. Under the aforesaid conditions, a signal 1 appears at the output of an AND-gate circuit (FIG. 10G) and is transmitted into a store circuit of the suitable trigger type 77, 78 or 79, 77 in accordance with the example envisaged.

The outputs of the trigger circuits of the various assemblies 43*j* are connected to the change-over circuit 44 which may comprise a shift register 80 having parallel inputs and parallel outputs. The outputs are limited to the provided horizontal sections, two in this example. After passage of the symbol, the items of information relating to *n* successive horizontal sections are recorded in the register 80. The sampling of the sections envisaged is effected after recentring of the information relating to the said sections facing the outputs. The vertical decentering signal emanating from the circuit 35 (FIG. 3) is, to this end, applied to the register by means of a frequency multiplication circuit 81 by three, so that one decentering period, equivalent to the jump of a photo-detector, determines a shift of three stages of the content of the register 80.

Figure 11:
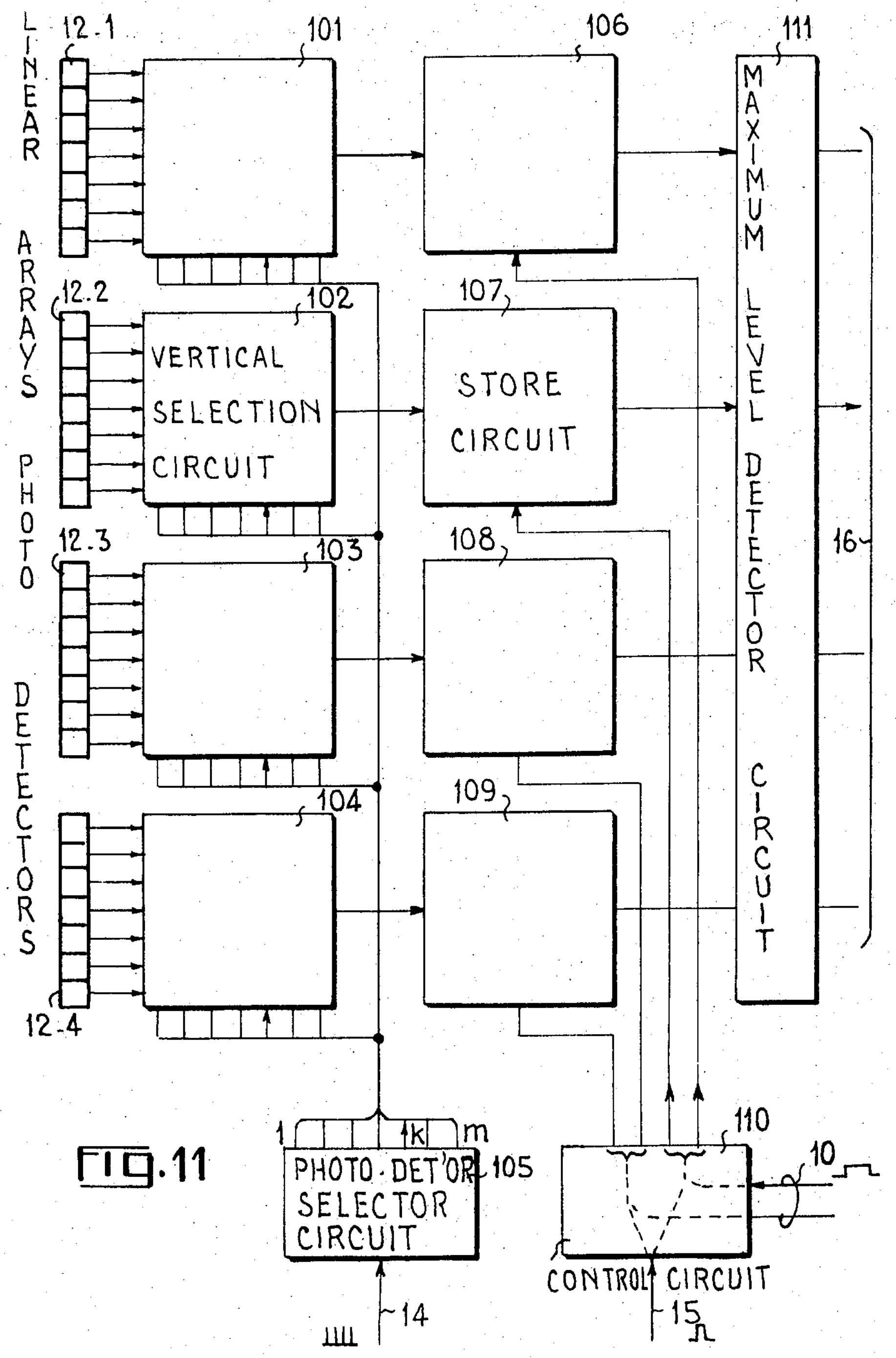
FIG. 11 is a diagram showing an embodiment of an analogue identification assembly.

FIG. 11 shows in the form of a simplified diagram, one embodiment of the analogue identification assembly 12–13 (FIG. 1). In accordance with this example, one considers a number reduced to four of symbols to be identified by the analogue assembly and a family number limited to two. The structure shown comprises, for each symbol, a vertical linear array (12-1 to 12-4) situated in the correlation plane; a vertical spatial selection circuit (103 to 104) of the (or of a reduced number) photo-detector on which the correlation peak appears as a function of the vertical decentering data received from the logic unit block at 14 and handled in a circuit 105 determining the row level *k* of the said photodetectors; a store circuit (106 to 109) triggered temporarily during the appearance of the horizontal centring gate emanating at 15 from the logic unit block, and provided that the said store circuit corresponds to a symbol of the family in question; an analogue OR-circuit 111 selecting in its turn, from the reduced plurality of correlation signals corresponding to the various symbols of the family concerned, that of strongest level, thus identifying in real time the projected symbol. The corresponding identification signal is transmitted to the processing unit 9. A representative circuit 110 may be formed of logic circuits, it processes from the horizontal centering data 15 and family data 10, a control signal applied solely to the store circuits in question by the said family. The various circuits shown are produced in accordance with known techniques not specified in the present invention. In particular, amplification circuits of the photo-detection outputs are not shown for reasons of simplification.

The recognition device described in the present invention enables, by a method having one or two stages of decision, identification of symbols of a predetermined group of symbols the said symbols having standardised characteristics from the point of view more especially of shape, thickness of the outline, contrast, height, spacing. The logic process is based under these conditions, on the topological criteria presented by the symbols and can tolerate slight deformations of the shape of the symbols as well as a rotation greater than that tolerated by a process having optical correlation generally limited to ±2°. The logic process is, moreover, insensitive to the variations in the thickness of the outline on condition that a minimum width is respected. The combination of the two assemblies, the one logic, the other analogue, enables a simplified realisation of each of them from the point of view, more especially, of logic circuits and a reduced number of paths of correlation and consequently of optical masks. Furthermore, the various selections. spatial, temporal and of the number of paths, effected in the analogue assembly enables the reliability thereof to be considerably increased.

Such a recognition device can effectively be used for the reading of documents in automatic administration systems more particularly mechanised administration.

Of course, the invention is not limited to the embodiment described and shown which was given solely by way of example.

What is claimed, is:

1. A symbol recognition system comprising in combination:

extraction means for forming a plurality of images of each symbol to be identified;

a logic recognition system including first input means for receiving one of said images, coding means for providing a digital code corresponding to the presence of portions of said one image at predetermined locations, decoding means for comparing said code with reference codes and means for detecting ambiguity in said decoding, said first input means comprising a linear array of photodetectors and analogue-digital conversion circuits supplied by said photodetectors and connected to said coding means, said extraction means comprising means for linearly shifting said one image past said array, said coding means comprising means for generating signals representative of the positioning of said one image along said shifting direction and said linear array direction;

an analogue recognition system using optical correlation and including second input means for receiving a plurality of said images and analogue means for identifying said images;

and control means for making analogue recognition system operative, said control means being operated by said ambiguity detecting means upon detection of ambiguity;

said locations corresponding to horizontal and vertical sections determined by secants having perpendicular directions, one direction corresponding to said shift direction considered horizontal, said linear array extending vertically, said coding means comprising circuits of vertical sections and circuits of horizontal sections delivering together said digital code, synchronisation circuits for generating a horizontal positioning signal provided to said analogue means and selection signals provided to horizontal and vertical section circuits, vertical centring circuits for generating a vertical positioning signal provided to said analogue means and selection signals provided to vertical and horizontal section circuits.

2. A symbol recognition system as claimed in claim 1, wherein each section comprises at least three localisations defining a 3 bits code, two localisations being situated at the ends and the third in the middle of the centered projected symbol along the direction of each section considered, said circuits of vertical section comprising logic circuits for sampling the items of information of possible intersections of the outline of said symbols with said locations taking account of delimited fluctuations of vertical positioning of the median outline and of a fixed positioning of localisations of top and bottom ends, for a standard height of the symbols.

3. A symbol recognition system as claimed in claim 1 wherein the horizontal section circuits comprise logic circuit supplied by said analogue-digital conversion circuits so as to be associated with the photo-detectors of the linear array, a certain number of end photodetectors at top and bottom of the array being excluded, each logic circuit generating a digital identification code of a specific horizontal section, said logic circuits supplying a logic selection circuit sampling by means of the vertical centring data only the information of horizontal sections envisaged.

4. A symbol recognition system as claimed in claim 1, wherein the synchronisation circuits comprise a time base circuit receiving a low frequency clock signal of a frequency proportional to the speed of shift of the projected symbol, a high frequency clock signal, a gate signal corresponding to the horizontal passage of the projected symbol and processing the various control signals of the logic circuits of vertical centring and of horizontal and vertical sections, the said control signals being repeated at the LF period during the recording time defined by the said gate and, at the HF period during the reading time defined during a fraction of the interval separating the end of the said gate from the beginning of the following gate.

5. A symbol recognition system comprising in combination:

extraction means for forming a plurality of images of each symbol to be identified;

a logic recognition system including first input means for receiving one of said images, coding means for providing a digital code corresponding to the presence of portions of said one image at predetermined locations, decoding means for comparing said code with reference codes and means for detecting ambiguity in said decoding, said first input means comprising a linear array of photodetectors and analogue-digital conversion circuits supplied by said photodetectors and connected to said coding means, said extraction means comprising means for linearly shifting said one image past said array, said coding means comprising means for generating signals representative of the positioning of said one image along said shifting direction and said linear array direction;

an analogue recognition system using optical correlation and including second input means for receiving a plurality of said images and analogue means for identifying said images, said second input means comprising a plurality of optical matched masks respectively corresponding to ambiguity generating symbols, optical integrating means and photodetection means, said extraction means projecting a plurality of images respectively on said masks;

and control means for making analogue recognition system operative, said control means being operated by said ambiguity detecting means upon detection of ambiguity, said control means being controlled by said positioning signals;

said analogue recognition system constituting a multi-channel optical correlator, each channel comprising a matched mask associated optically with a matrix of photodetectors comprising at least one vertical linear array of photodetectors, the direction of which being perpendicular to said shifting direction, the outputs of said photo-detectors being connected to a spatial selection circuit of at least one photodetector on which is situated the correlation peak, the said selection being produced from a first positioning signal corresponding to the vertical centring, the said selection circuit being connected by a single output to a store circuit, an ambiguity detection signal and a second positioning signal corresponding to the horizontal centering being applied to a selector circuit connected by its output to the said store circuits respectively and delivering a control signal for selecting the store circuits of the ambiguity detection in question at the instant corresponding to the horizontal centering of the optical projection at the input of said analogue device, the store circuits being connected by their output to an analogue OR-circuit selecting in its turn the signal of strongest level from the signals received from the said selected store circuits.

* * * * *